United States Patent [19]
Griggs

[11] Patent Number: 5,935,360
[45] Date of Patent: Aug. 10, 1999

[54] METHOD FOR REPAIRING A STRIP BONDED TO AN ARTICLE SURFACE

[75] Inventor: Philip R. Griggs, Cincinnati, Ohio

[73] Assignee: General Electric Company, Cincinnati, Ohio

[21] Appl. No.: 08/936,427

[22] Filed: Sep. 24, 1997

[51] Int. Cl.⁶ .................................................. B32B 35/00
[52] U.S. Cl. ....................... 156/94; 29/402.18; 264/36.22
[58] Field of Search .................... 156/94, 98; 264/36.19, 264/36.22; 29/402.18; 428/63

[56] References Cited

U.S. PATENT DOCUMENTS

| | | | |
|---|---|---|---|
| 4,659,525 | 4/1987 | Speer | 264/36.22 |
| 5,573,377 | 11/1996 | Bond | 416/219 R |
| 5,814,174 | 9/1998 | Fong | 156/94 |

*Primary Examiner*—Daniel Stemmer
*Attorney, Agent, or Firm*—Andrew C. Hess; Gerry S. Gressel

[57] ABSTRACT

A method for repairing a discrete damaged part of a strip bonded to an article surface includes applying a first removable masking member along and adjacent the damaged part of the strip and separated from the strip by a gap of at least 0.005", and applying a second removable masking member to the outer surface of the strip. A repair adhesive, which can be cured at a curing temperature less than a higher temperature which can result in damage to properties of the article or a surface coating, is applied at and beneath an edge of the damaged part of the strip. Then the repair adhesive is cured at the curing temperature. Apparatus for bonding a strip to an end portion of the article includes a body having a channel there through defined, in part, by spaced apart support surfaces for article surfaces and positioned relative one to the other at a relative spatial position substantially coinciding with the relative spatial position of the article surfaces. The support surfaces include surface profiles substantially reproducing surface profiles of the article surfaces.

4 Claims, 4 Drawing Sheets

METHOD FOR REPAIRING A STRIP BONDED TO AN ARTICLE SURFACE

BACKGROUND OF THE INVENTION

This invention relates to repair of a strip of material bonded to an article surface, and more particularly, in one form, to the repair of a strip of wear resistant material bonded to the surface of a gas turbine engine blade.

The manufacture of gas turbine engine blades includes manufacture of composite blades incorporating fibrous or filament type materials, typically including a matrix and a reinforcing material. Cooler operating blades in such an engine include fan or compressor blades frequently made of stacked or laid-up plies of a reinforced polymeric material. Such blades are described in a variety of publications including U.S. Pat. No. 3,883,267—Baudier et al., patented May 13, 1975; and 5,573,377—Bond et al., patented Nov. 12, 1996.

The surface of certain composite blades is relatively soft compared with a metal surface with which it might interact. Therefore, it has been a practice to bond a wear resistant material to a composite blade surface which is subject to a rubbing or fretting type wear as a result of contact with a cooperating member during engine operation. One form of wear resistant material used in a gas turbine engine is a low friction wear coat on the dovetail of a composite blade as shown at 38 in FIGS. 4 and 5 of the above identified Bond et al. patent. Another type of such a wear resistant material is in the form of a strip of material, such as pre-impregnated Class and Teflon fiber hybrid cloth, bonded with an adhesive to composite blade surfaces as the dovetail, airfoil, etc. Such a wear strip has various edges which can be damaged, including a lengthwise edge, end edges, the edge of a corner at the juncture of a lengthwise edge and an end edge, etc. Such damage can result from operation, mishandling, etc., which has caused fraying or loosening of fibers of the strip, or disbonding of the adhesive bonding the wear strip to the blade surface.

A current practice specifies complete removal of a damaged wear strip and its adhesive, followed by replacement of the strip using a curing cycle at about 300° F. and the application of pressure, for example in an autoclave. Removal of the entire wear strip and complete replacement by processing at such a temperature and pressure is time consuming and requires use of relatively costly apparatus, adding to the cost of repair. However, frequently damage to the wear strip is in a relatively small area and is localized, for example a discrete disbanding or fraying of a portion along a lengthwise edge of the wear strip.

BRIEF SUMMARY OF THE INVENTION

The present invention, in one form, provides a method for repairing a discrete damaged part of a strip bonded to an article surface, including applying a first removable masking member to the article surface along and adjacent to the discrete damaged part of the strip and separated from an edge of the strip connected with the damaged part by a gap of at least 0.005"; and applying a second removable masking member to an outer surface of the strip at least over the discrete damaged part and portions bordering the discrete damaged part. A repair adhesive, which can be cured at a curing temperature less than a higher temperature which can result in damage to properties of the article, is applied to the discrete damaged part at the edge of the strip, beneath the second masking member and the wear strip. The repair adhesive is cured at the curing temperature and the first and second masking members are removed.

In another form, the present invention provides apparatus for use in bonding the strip to an article surface at an end portion of an article, the end portion including an article first surface having a first surface profile, and an article second surface spaced apart from the article first surface and having a second surface profile. The article first and second surfaces are disposed with respect one to the other at a relative spatial position. The apparatus comprises a body having there through a body channel to receive the end portion of the article. The channel is defined by a plurality of inwardly facing body surfaces which include first and second support surfaces spaced apart and positioned relative one to the other substantially to coincide with the relative spatial position respectively of the article first and second surfaces. The first support surface is shaped substantially to reproduce the first surface profile and to receive and register with the article first surface; and the second support surface is shaped substantially to reproduce the second surface profile and to receive and register with the article second surface.

DETAILED DESCRIPTION OF THE INVENTION

Rather than removing and replacing an entire strip of material, for example a cloth wear strip adhesively bonded to a surface of an article such as a composite gas turbine engine blade, to repair only a local, discrete damaged portion, the present invention repairs only the discrete damaged part. The combination of particularly positioned removable masking members and a repair adhesive which can be cured at a temperature which will not result in damage to properties of the article or of coatings or other surface treatment on the article, the present invention eliminates the risk of such damage, or loss of surface accuracy required for efficient operation of such an article. According to this invention, a relatively small, discrete damaged, for example disbanded, part of a wear strip can be repaired by a local, discrete repair while allowing the strip to remain in place on an article surface. The apparatus form of the invention is in the nature of a tool constructed for use in such a repair at an article end portion, for example the base or dovetail of a blade.

Figure 1:
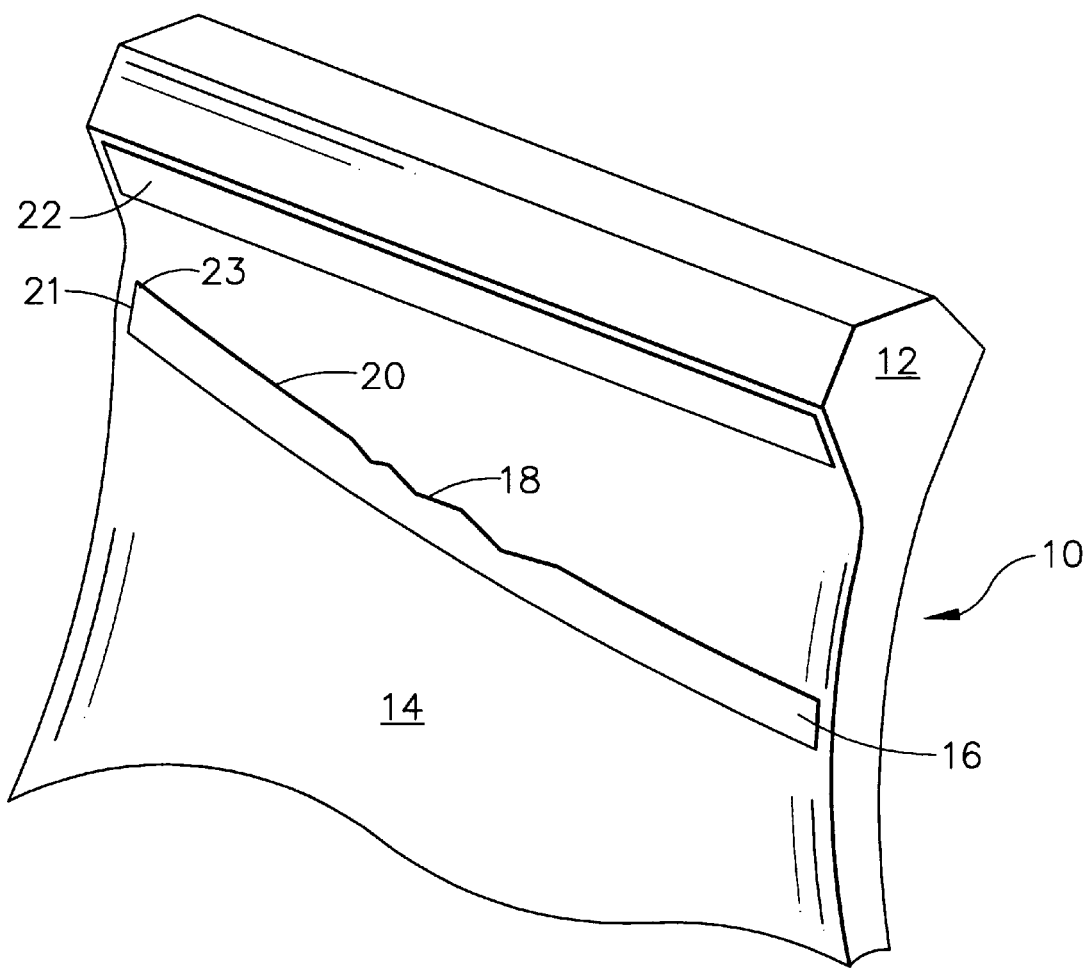
FIG. 1 is a partially fragmentary perspective view of a portion of a fan blade showing a disbanded wear strip lengthwise edge portion on the blade airfoil.

The method of the present invention will be more clearly understood by reference to the drawings. The partially fragmentary perpective view of FIG. 1 shows a gas turbine engine fan blade generally at 10, including a base or root 12 and an airfoil surface 14 to which had been bonded a cloth wear strip 16. Wear strip 16 was applied to an area of the airfoil which interacts or rubs with a platform seal when assembled in an engine.

The airfoil was of a gas turbine engine fan blade manufactured as a composite structure formed by bonding together a plurality of reinforced plies including polymeric material. The blade typically includes plies of unidirectional and woven carbon fiber reinforced with epoxy resin cured to form a molding to which can be bonded erosion resistant coatings, metal guards, and cloth wear strips. The blade usually is painted on the airfoil surface areas. Such composite structures have been and are widely used in the gas turbine art, some of which has been identified by the patents listed above and by the publications referred to in such patents. Because they can include polymeric materials in their structure, as well as erosion resistant coatings and paints on their surface, such articles or their surfaces can be affected adversely by temperatures at which the polymer, coatings and/or paints can flow or deteriorate. Temperature limitations restrict use of such articles to the cooler operating portions of the engine such as the fan and compressor sections.

The cloth wear strip in the example of the drawings was a pre-impregnated glass/Teflon material hybrid cloth which had been bonded with an adhesive to the article or airfoil surface 14. As shown in FIG. 1, the wear strip 16 was disbanded from article surface 14 at a discrete part shown generally at 18 along lengthwise edge 20 of strip 16 Such damage or disbanding can occur at other edges of the strip such as at an end edge 21 or a corner edge 23 at the juncture between edges 20 and 21. As used herein, the term "edge" in respect to a strip is intended to include all types of strip edges. Included in FIG. 1 is second wear strip 22 which had been bonded to base 12 to inhibit dovetail wear when assembled and operated with a cooperating rotor.

As was mentioned above, a current repair of the damaged wear strip 16 in FIG. 1 includes complete removal and replacement of the strip, involving use of temperatures as high as about 300° F. Such practice includes the risk of damage to the article itself, for example in the form of loss of properties or surface accuracy or both. For example, when a complete removal and replacement procedure is carried out, other undamaged wear strips, erosion resistant coating, and paint require special protection; and the blade must be supported in a special tool during the curing cycle. When the entire damaged fabric wear strip is removed, the underlying surface must be prepared for the bonding of a replacement fabric wear strip. Such an operation can damage the fiber reinforced polymeric material molding of the blade. As a result, it has been observed that the replacement fabric wear strip has exceeded the required profile tolerance.

Figure 2:
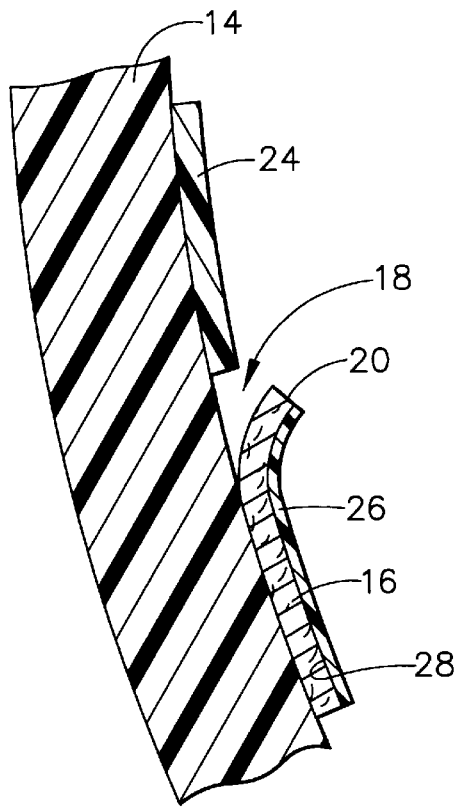
FIG. 2 is a fragmentary sectional view of the airfoil of FIG. 1 with removable masking members applied according to the present invention.

With reference to the fragmentary sectional view of FIG. 2. the disbonded, damaged part 18 is shown along lengthwise edge 20 of wear strip 16. According to the method of the present invention, a first removable masking member 24 is applied to article surface 14 along and adjacent to the discrete damaged part 18 and separated from the lengthwise edge 20 of strip 16 by a gap G, as measured and shown in FIGS. 4 and 5, on surface 14 of at least 0.005". According to the present invention, such a gap is necessary to allow and not interfere with formation of an adequate fillet of cured repair adhesive to enable the subsequent removal of the masking members to shear or break with the cured adhesive. The present invention provides gap G to assure that a fillet is formed at the repaired part. The existence of a fillet rather than a sharp edge provides a stronger bond by eliminating a stress point or edge at the juncture between the strip and the article surface. A second removable masking member 26 is applied to outer surface 28 of strip 16, to protect surface 28 from subsequent application of repair adhesive and from surface damage during practice of the repair method. Such masking members conveniently are in the form of pressure sensitive adhesive tape, commonly known and sold commercially as flashbreaker tape. Such tape, which is capable of withstanding epoxy curing temperatures, is commercially available in a variety of weights as required to provide a neat edge where resin may flow over an edge requiring the tape to break a thin layer of adhesive. There are a variety of bases for the tape, including polyester, nylon, and polytetrafluorethylene. The adhesives associated with such tape include those based on rubber or fully cured silicone.

Figure 3:
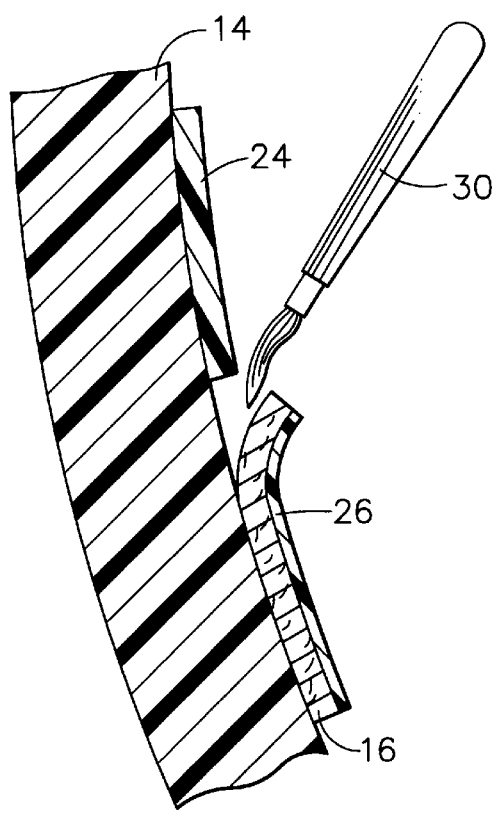
FIG. 3 is a fragmentary sectional view of the airfoil of FIG. 2 showing application of repair adhesive.

In this example after the first and second masking members are in position, a repair adhesive is applied to the discrete damaged part 18 at the lengthwise edge 20 of strip 16 as shown in the fragmentary sectional view of FIG. 3. The repair adhesive, represented by brush 30 in that Figure, is applied beneath the second masking member 26 and wear strip 16, as shown. The repair adhesive was selected as one which can be cured at a curing temperature less than a higher temperature at which protection of other parts of the blade, such as the erosion resistant coating and the paint, is required. For example, as mentioned above, it has been observed in connection with the type of composite fan blade described above, curing at about 300° F. during complete wear strip removal and replacement has resulted in damage to the erosion resistant coating, typically of urethane material. In one form of the present invention, selected was a repair adhesive, for example an epoxy resin which can be cured at a temperature no greater than about 250° F. In a preferred form, the present invention uses a repair adhesive which can be cured in a temperature range up to about 200° F., for example about 180° F., less than the boiling point of water. In this way, any water present will not evaporate rapidly or explosively during curing. The current practice involving curing at about 300° F. requires a separate drying cycle prior to curing to avoid explosive water removal.

Figure 4:
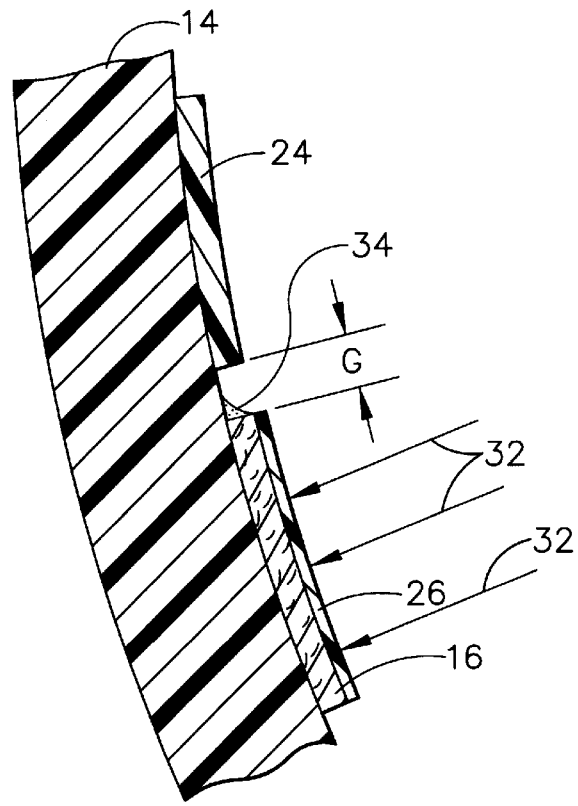
FIG. 4 is a fragmentary sectional view of the airfoil of FIG. 3 showing application of force to press the wear strip, masking member and article surface together.

After application of the repair adhesive, as shown in FIG. 3, a substantially uniform force or pressure, represented by arrows 32 in the fragmentary sectional view of FIG. 4, was applied to the second masking member 26 to press the damaged discrete part 18 of wear strip 16 into contact with article surface 14. Then the repair adhesive was cured, in this example by heating at a temperature of no greater than 180° F., thereby forming a fillet 34 of repair adhesive shown in more detail in the enlarged view of FIG. 5.

Figure 5:
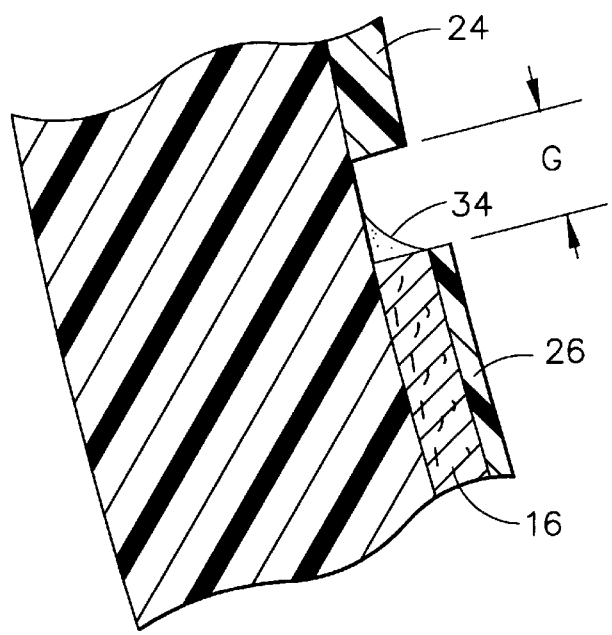
FIG. 5 is an enlarged view of a portion of FIG. 4.

Shown in FIGS. 4 and 5 is the above mentioned gap G which, according to the present invention is at least 0.005" to provide a fillet and to enable removal of the masking members to break away or shear the cured repair adhesive. It has been recognized that a gap of no less than 0.005" is required to enable such action to occur. According to one form of the present invention, it is preferred that gap G be in the range of about 0.02–0.04". The masking member 26 on surface 28 of wear strip 16 protects such surface from extrusion thereon of repair adhesive during application of pressure 32 and curing of the repair adhesive. In this way, the present invention provides the combination of first removable masking member 24 positioned at a particular gap distance from the wear strip 16 and second removable masking member 26 protecting outer surface 28 of wear strip 16 to enable local repair of damaged discrete part 18 of wear strip 16.

In one specific example, a composite fan blade of the type shown in FIG. 1 included a wear strip of preimpregnated glass/Teflon hybrid cloth adhesively bonded to the blade airfoil as shown at 16 in FIG. 1. The wear strip extended almost completely across the airfoil to resist wear with a cooperating platform seal during engine operation. After operation in an engine, it was observed that a relatively small, discrete, local part of the wear strip had become damaged, being frayed and disbonded from the blade surface. To repair the damaged part according to the method of the present invention, the damaged part as well as the entire wear strip area of the blade was cleaned with a solvent which removes surface contaminants without affecting the wear strip or the blade surface. In this example the solvent acetone was used. Care was taken not to extend the frayed or disbanded part of the wear strip.

After cleaning, frayed fibers carefully were removed from the damaged part of the wear strip using a razor blade. Then the masking members 24 and 26 in the drawings in the form of about 0.002" thick flashbreaker tape No. 855, manufactured by 3M Company, were applied. First, masking tape 24 was applied substantially across the entire surface of the blade adjacent the wear strip, with a gap G of about 0.02–0.04" from the lengthwise edge 20 of the wear strip, as described above. Then masking tape 26 was applied in a single piece over the wear strip and secured without wrinkles or bubbles. Masking tape 26 was located such as by positioning or trimming to coincide with the lengthwise edge of the wear strip.

With the masking members in place, a catalyzed epoxy repair adhesive, commercially available as Dexter Hysol EA 9396 material, was prepared and applied with a small brush into the damaged part from lengthwise edge 20, as shown in FIG. 3. The repair adhesive applied was sufficient to wet the surfaces, though complete filling of the disbanded portion was found not to be required. After waiting about ½ hour for the repair adhesive to penetrate, pressure was applied to press the damaged part of the wear strip into contact with the blade surface. With the pressure applied, the repair adhesive first was cured at room temperature for about 12–24 hours, then heated to cure in an oven in the range of up to about 200° F., in this example about 160–180° F., for about 1 hour. After curing, a fillet of repair adhesive, 34 in FIG. 5, was provided within gap G. Then the flashbreaker masking tapes were removed, resulting in a clean break or shearing of the masking tapes from the repair adhesive at the fillet as a result of the relative placement of the masking members according to the present invention.

When the wear strip is at an end portion of an article, such as shown by wear strip 22 on blade base 12 in FIG. 1, a form of the present invention provides apparatus for the accurate application of uniform pressure to press the damaged part into contact with the blade surface during the wear strip repair method of the present invention. One form of such apparatus is shown in the fragmentary sectional view of FIG. 6 in which base 12 of fan blade 10 is disposed within apparatus body 36 during repair. For simplicity of presentation of this example, the first and second removable masking members 24 and 26 described above are not included in FIGS. 6 and 7 so that the cooperating portions can more easily be seen. However, it should be understood that they are used as described above in the repair method of the present invention on wear strips on the base 12.

Figure 6:
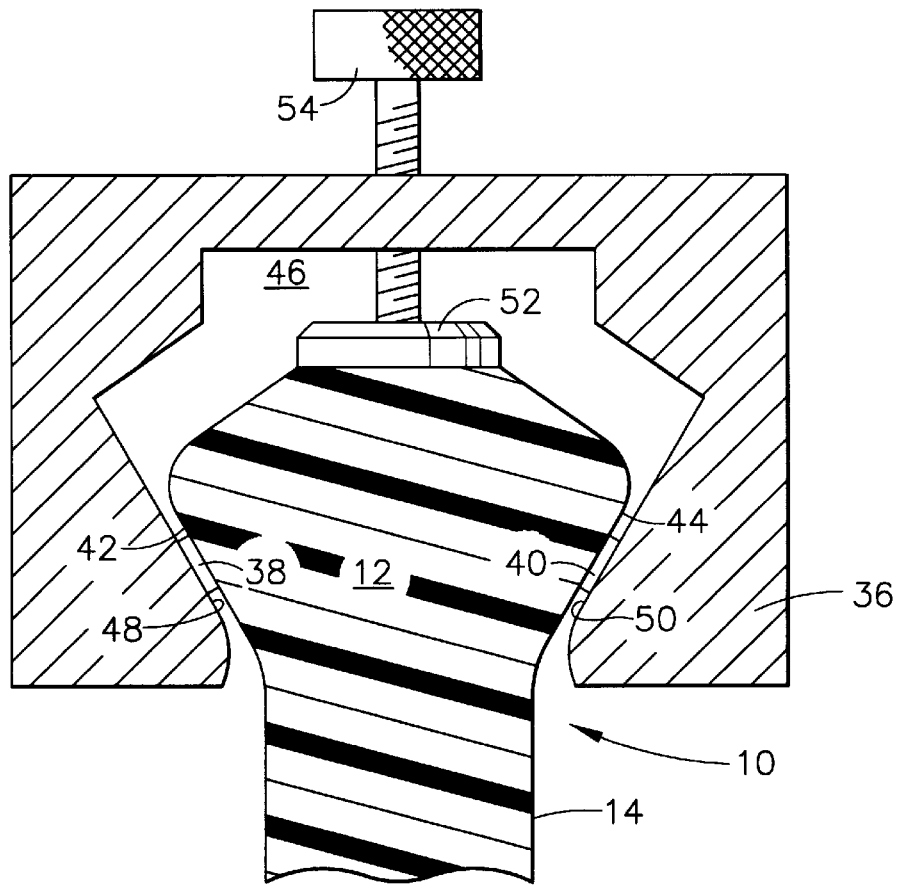
FIG. 6 is a fragmentary, partially sectional view of one form of the apparatus of the present invention, carrying an end of an article in the form of a blade base.

Base 12 includes a pair of wear strips 38 and 40, one type of which is shown in FIG. 1 as wear strip 22. Wear strip 38 is bonded to article first surface 42 and wear strip 40 is bonded to article second surface 44. As shown in FIG. 6, the article first and second surfaces 42 and 44 are disposed with respect one to the other spaced apart at a distance, attitude and location herein called a relative spatial position. Article first surface 42 has a first surface profile and article second surface 44 has a second surface profile, which can be substantially the same as or different from the first surface profile. Such surface profiles are designed for the blade base to assure accurate and appropriate registry with a cooperating member such as a rotor. Change in a surface profile during repair of a wear strip can result in such events as reduced efficiency and/or lower operating life of the repaired blade. As will be described below, the apparatus of the present invention substantially reproduces such relative spatial position and surface profiles to enable repair of an article end portion such as a blade base while maintaining design accuracy.

The apparatus form in FIG. 6 includes a body 36 having there through a body channel 46 shaped to receive the end portion or base 12 of blade 10. Channel 46 is defined by a plurality of inwardly facing body surfaces as shown in FIG. 6. These include first support surface 48, shown in more detail in FIG. 7, and second support surface 50. The first and second article support surfaces 48 and 50 are spaced apart and positioned relative one to the other substantially to coincide with the relative spatial position respectively of the article first and second surfaces 42 and 44. In addition, first support surface 48 is shaped substantially to reproduce the first surface profile of article first surface 42 and second support surface 50 is shaped substantially to reproduce the second surface profile of article second surface 44.

During use of the apparatus to practice the method of the present invention, the support surface 48 registers with a removable masking member over wear strip 38 on article first surface 42 and support surface 50 registers with a removable masking member over wear strip 40 on article second surface 44. In a preferred form of the apparatus, the first and second support surfaces 48 and 50 are located in body 36 at the relative spatial position and the body is held so that the above described registry of the removable masking members and the respective support surfaces occurs by gravity on the blade when the article end portion is disposed within the body channel 46. In this way, the blade hangs freely and the base or root axis is substantially vertical. This preferred arrangement provides equal initial pressure on the masking members and the wear strips beneath them prior to use or application of any additional pressure or force to press the wear strips toward the article surface.

Figure 7:
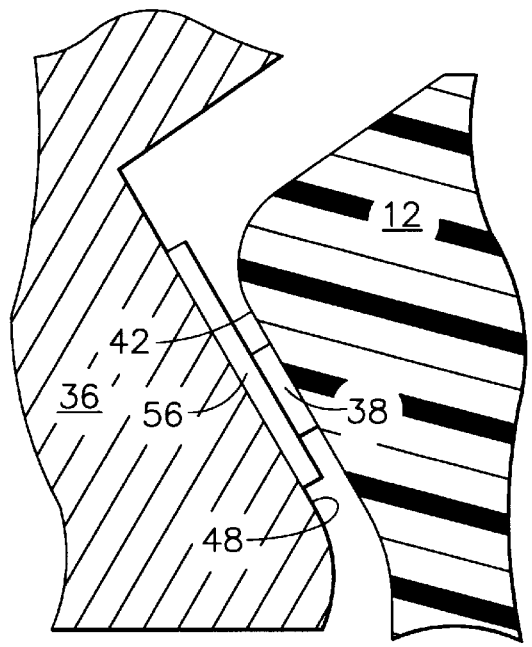
FIG. 7 is an enlarged view of a portion of FIG. 6.

With the members in registry as described, the one form of the apparatus includes means to apply additional pressure or a force to press the masking members and the wear strips toward their respective article surfaces during practice of a repair method of the present invention as described above. In one form of the apparatus used to meet relatively stringent tolerances, such means includes one or more typical screw clamps, one of which is shown at 52 in FIG. 6. In this example, the clamp, including a self-aligning swivel foot with a plastic or elastomeric pad (not shown) and a torque limiting handle 54 including a torque limiting feature for accurate control of the applied pressure. In that embodiment, three clamps 52 were disposed through body 36 to apply a uniform pressure to base 12 as shown. In one form of this apparatus, article support surfaces 48 and 50 are faced with a relatively soft non-chafing material, such as a thermoplastic tape, herein called a cushioning material, to protect the blade surfaces from damage, such as gouging. A portion of such form is shown in FIG. 7, which is an enlarged view of a portion of FIG. 6. In FIG. 7, removable cushioning material 56 is disposed on first support surface 48 to protect wear strip 38. Through use of this apparatus, high accuracy profile and surface finish of the support surfaces holds a damaged part of a strip at the desired contour.

The present invention has been described in connection with various specific examples, embodiments and combinations. However, it will beskilled in the arts inskilled in the arts involved that this invention is capable of a variety of modifications, variations and amplifications without departing from its scope as defined in the appended claims.

I claim:

1. In a method for repairing a discrete damaged part of a strip bonded to an article surface, the strip having an outer surface, and an edge connected with the damaged part of the strip, the steps of:

applying a first removable masking member to the article surface along and adjacent to the discrete damaged part of the strip and separated from the edge of the strip by a gap of at least 0.005";

applying a second removable masking member to the strip outer surface at least over the discrete damaged part and portions of the strip bordering the discrete damaged part;

providing a repair adhesive which can be cured at a curing temperature in a temperature range less than a higher temperature which can result in damage to properties of the article;

applying the repair adhesive to the discrete damaged part at the edge of the strip, beneath the second masking member and the strip;

curing the adhesive at the curing temperature; and, removing the first and second masking members.

2. The method of claim 1 in which, after applying the repair adhesive and before curing the adhesive, pressure is applied to the second masking member toward the article surface, at least over the damaged part of the strip, to press the strip into contact with the article surface.

3. The method of claim 2 wherein the article is a composite turbine engine blade, the strip is a wear resistant strip of cloth including fibers, and the damaged part includes a portion of frayed fibers along the edge, further comprising the steps of:

removing fibers from the frayed portions of the strip;

locating the second masking member to coincide with the edge of the strip;

providing the repair adhesive as having a curing temperature in a range up to about 250° F.;

curing the adhesive at the curing temperature, providing a cured adhesive fillet between the article surface and the second masking member; and, removing the masking members so that the second masking member shears the cured adhesive fillet.

4. The method of claim 3 in which:

the blade includes a surface coating;

the gap between the first and second masking members is about 0.02–0.04";

the second masking member is in a single piece along the length of the strip; and, the curing temperature is in a range up to about 200° F.

\* \* \* \* \*